United States Patent
Armstrong et al.

(10) Patent No.: US 6,951,357 B2
(45) Date of Patent: Oct. 4, 2005

(54) LIGHTWEIGHT COMPOSITE TAILGATE

(75) Inventors: Bradford D. Armstrong, Barrie (CA); Martin R. McLeod, Barrie (CA); Alireza Ebrahimi, Thornhill (CA); Rudolpf A Schrempf, Brampton (CA)

(73) Assignee: Decoma International Inc., Concord (CA)

( * ) Notice: Subject to any disclaimer, the term of this patent is extended or adjusted under 35 U.S.C. 154(b) by 0 days.

(21) Appl. No.: 10/758,909

(22) Filed: Jan. 16, 2004

(65) Prior Publication Data

US 2004/0164580 A1 Aug. 26, 2004

Related U.S. Application Data

(60) Provisional application No. 60/440,550, filed on Jan. 16, 2003.

(51) Int. Cl.$^7$ .............................................. B62D 33/03
(52) U.S. Cl. .......................... 296/57.1; 296/50; 296/191
(58) Field of Search ..................... 296/50, 57.1, 186.1, 296/191, 193.02; 49/501; 52/630, 782.1, 783.1, 783.19, 784.1, 799.1, 799.11, 800.1

(56) References Cited

U.S. PATENT DOCUMENTS

| | | | | |
|---|---|---|---|---|
| 2,585,976 A | * | 2/1952 | Teeter | 52/266 |
| 2,779,303 A | * | 1/1957 | Cupples | 114/79 R |
| 4,769,951 A | | 9/1988 | Kaaden | 49/502 |
| 4,838,606 A | * | 6/1989 | Furubayashi et al. | 296/187.12 |
| 5,000,997 A | * | 3/1991 | Ritchie et al. | 428/78 |
| 5,140,913 A | * | 8/1992 | Takeichi et al. | 105/397 |
| 5,228,742 A | | 7/1993 | Johnson et al. | 296/191 |
| 5,660,427 A | | 8/1997 | Freeman et al. | 296/190.08 |
| 5,762,394 A | | 6/1998 | Salmonowicz et al. | 296/146.5 |
| 5,857,732 A | | 1/1999 | Ritchie | 296/146.5 |
| 5,944,373 A | | 8/1999 | Seksaria et al. | 296/57.1 |
| 5,947,540 A | | 9/1999 | Pariseau et al. | 296/57.1 |
| 6,048,022 A | | 4/2000 | Ishibashi et al. | 296/187.09 |
| 6,431,630 B1 | | 8/2002 | Meinke | 296/50 |
| 6,676,187 B1 | * | 1/2004 | Miskech et al. | 296/50 |
| 2003/0110705 A1 | * | 6/2003 | Hlavach et al. | 49/501 |
| 2004/0084925 A1 | * | 5/2004 | Ojanen | 296/50 |
| 2004/0145215 A1 | * | 7/2004 | Taguchi et al. | 296/187.02 |
| 2004/0164580 A1 | * | 8/2004 | Armstrong et al. | 296/50 |

FOREIGN PATENT DOCUMENTS

DE            3721783 A1 *  1/1988  ................. 296/191

* cited by examiner

Primary Examiner—Jason Morrow
(74) Attorney, Agent, or Firm—Clark Hill PLC

(57) ABSTRACT

A tailgate assembly for a motor vehicle includes an outer panel, an integrally formed inner structural panel, and at least one reinforcing panel. The inner structural panel is coupled to the outer panel and includes a support surface facing the outer panel. The inner structural panel also includes spaced apart upper and lower walls extending laterally along the support surface, a pair of end walls extending between the upper and lower walls, and a plurality of ribs spaced apart and disposed between the upper and lower walls. The plurality of ribs also extends laterally between the end walls. The reinforcing panel is disposed between the outer and inner structural panels. The reinforcing panel is secured to the integrally formed inner structural panel between a portion of the plurality of ribs to add rigidity to the tailgate assembly.

18 Claims, 5 Drawing Sheets

LIGHTWEIGHT COMPOSITE TAILGATE

CROSS REFERENCE TO RELATED APPLICATION

This application claims priority from and the benefit of U.S. Provisional Patent Application Ser. No. 60/440,550 filed Jan. 16, 2003.

FIELD OF THE INVENTION

This invention relates to a tailgate for a motor vehicle. More particularly, the invention is related to a lightweight, composite tailgate for a pick-up truck.

DESCRIPTION OF RELATED ART

A conventional tailgate for a motor vehicle is formed from a number of steel sheets that are stamped and welded together. A steel reinforcement member is welded to the sheets to provide strength and rigidity to the tailgate. These conventional tailgates have, however, certain disadvantages. For instance, the tooling required to manufacture the tailgates from steel is expensive. Steel is also vulnerable to corrosion upon prolonged exposure to certain environmental conditions, which detracts from the appearance of the tailgate. In addition, the use of steel results in a heavy tailgate that is, for some individuals, difficult to open and close. Such a heavy tailgate also adds to the overall weight of the motor vehicle, which unnecessarily increases fuel consumption.

Consequently, plastic panels have been incorporated into the conventional tailgates in an attempt to reduce the weight thereof. U.S. Pat. No. 5,944,373 discloses a tailgate assembly including a metal sheet deformed into an inner panel, an outer panel, a top panel, a bottom panel, and side panels. A plastic reinforcing module is disposed between the inner and outer panels, and is affixed to the inner structural panel by a fastener. The reinforcing module includes a plurality of legs extending in various directions in order to add stiffness, strength, and dent resistance to the tailgate assembly.

U.S. Pat. No. 6,431,630 discloses a tailgate assembly including an outer panel assembly formed from sheet metal, an inner panel module formed from a plastic material, and attachment means for securing the inner panel module to the outer panel assembly. The inner structural panel module includes an inner panel member, latch devices, a handle assembly, and linkage means. The inner panel module is pre-assembled and then coupled to the outer panel assembly to form the final tailgate assembly. The plastic inner panel module is, however, unsupported when the tailgate assembly is lowered. As a result, the plastic inner panel module will flex under normal loads and provides only limited torsional resistance.

SUMMARY OF THE INVENTION

It is desirable to provide a lightweight composite tailgate that is corrosion resistant and having substantially reduced tooling costs as compared with conventional steel tailgates.

According to one aspect of the invention, a tailgate assembly for a motor vehicle includes an outer panel, an integrally formed inner structural panel, and at least one reinforcing panel. The inner structural panel is coupled to the outer panel and includes a support surface facing the outer panel. The inner structural panel also includes spaced apart upper and lower walls extending laterally along the support surface. A pair of end walls extends between the upper and lower walls. A plurality of ribs is spaced apart and disposed between the upper and lower walls. The plurality of ribs extends laterally between the end walls. The reinforcing panel is secured to the integrally formed inner structural panel between a portion of the plurality of ribs to add rigidity to the tailgate assembly.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
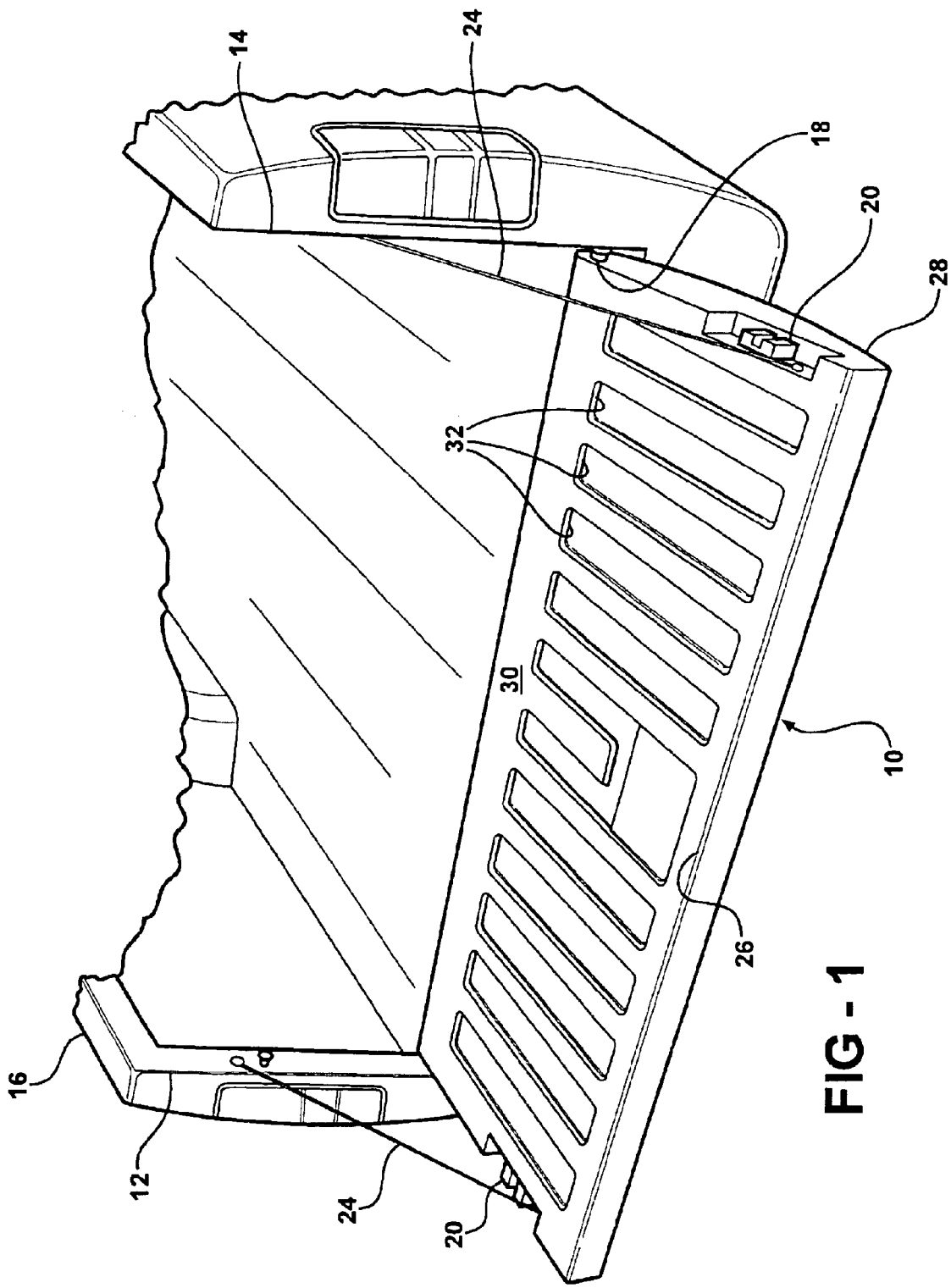
FIG. 1 is a fragmentary, rear perspective view of a pick-up truck including a tailgate assembly according to the invention.

Referring to FIG. 1, a tailgate assembly, generally indicated at 10, is pivotally coupled to opposing sidewalls 12, 14 of a motor vehicle 16 to selectively create a wall therebetween. The tailgate assembly 10 includes conventional hinges 18 (one shown), latches 20, a handle 22 (shown in FIG. 4) for controlling the release of the latches 20, and cable travel limits 24 for stopping movement of the tailgate assembly 10 away from the sidewalls 12, 14. In a preferred embodiment, the motor vehicle 16 is a pick-up truck.

The tailgate assembly 10 includes an inner structural panel 26 coupled to an outer decorative panel 28. The inner structural panel 26 includes a loading surface 30 having a plurality of recesses 32 formed therealong. Each recess 32 is spaced apart from one another laterally. Each of the plurality of recesses 32 is rectangular-shaped with rounded corners. Preferably, the recesses 32 have a depth of up to 10–15 mm, preferably about 2–5 mm. It is, however, appreciated that the shape, size and depth of each of the recesses 32 may vary.

Figure 2:
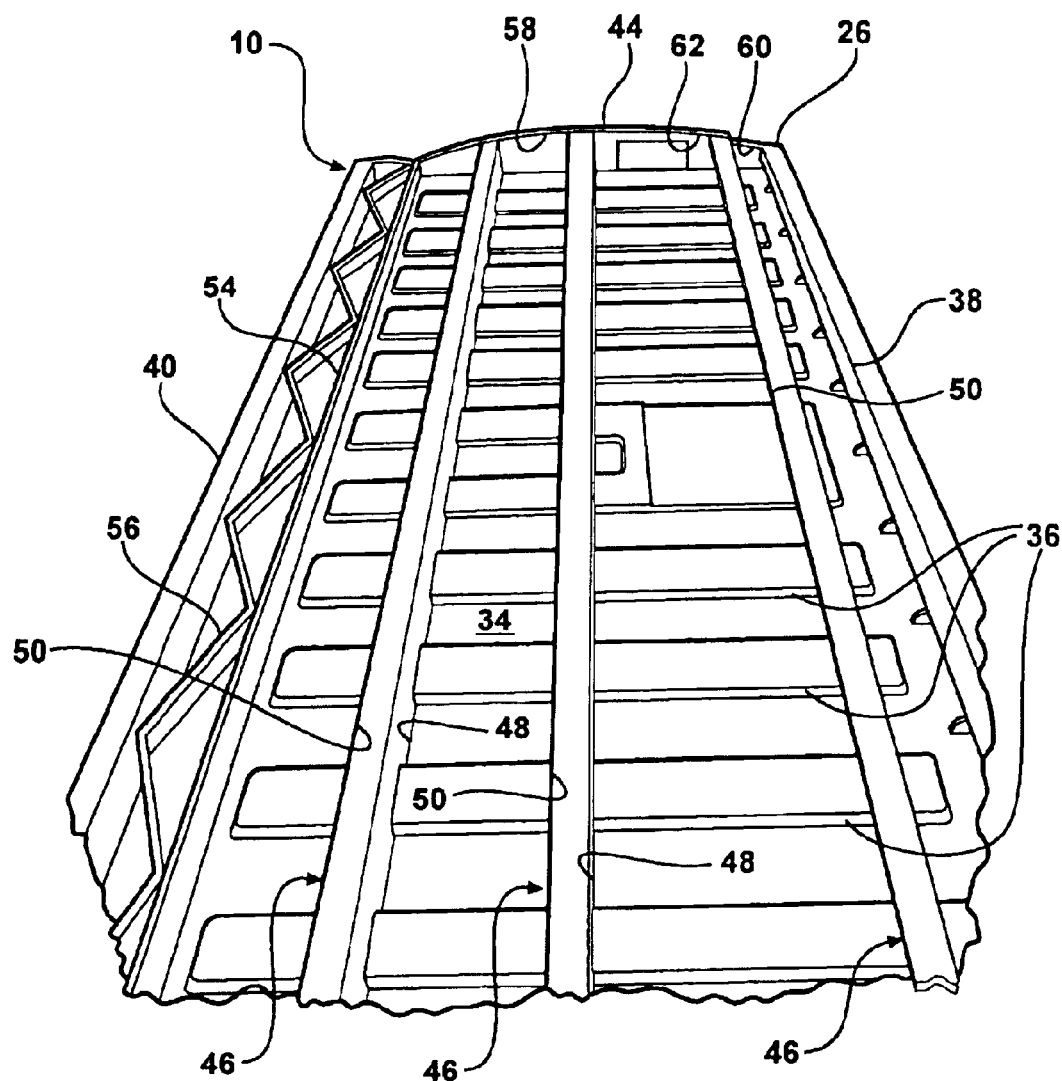
FIG. 2 is a fragmentary, perspective view of an inner structural panel of the tailgate assembly.

Referring to FIG. 2, the inner structural panel 26 includes a support surface 34 opposite the loading surface 30. The recesses 32 appear as embossments 36 along the support surface 34. The inner structural panel 26 is integrally molded using a thermoplastic material, and preferably incorporates long glass fibers. A preferred method of manufacturing the inner structural panel 26 is disclosed in U.S. Pat. Nos. 5,204,127, 5,185,117, and 5,165,941. In addition, the material utilized for the inner structural panel 26 may include a UV stabilizer and color pigments.

Figure 3:
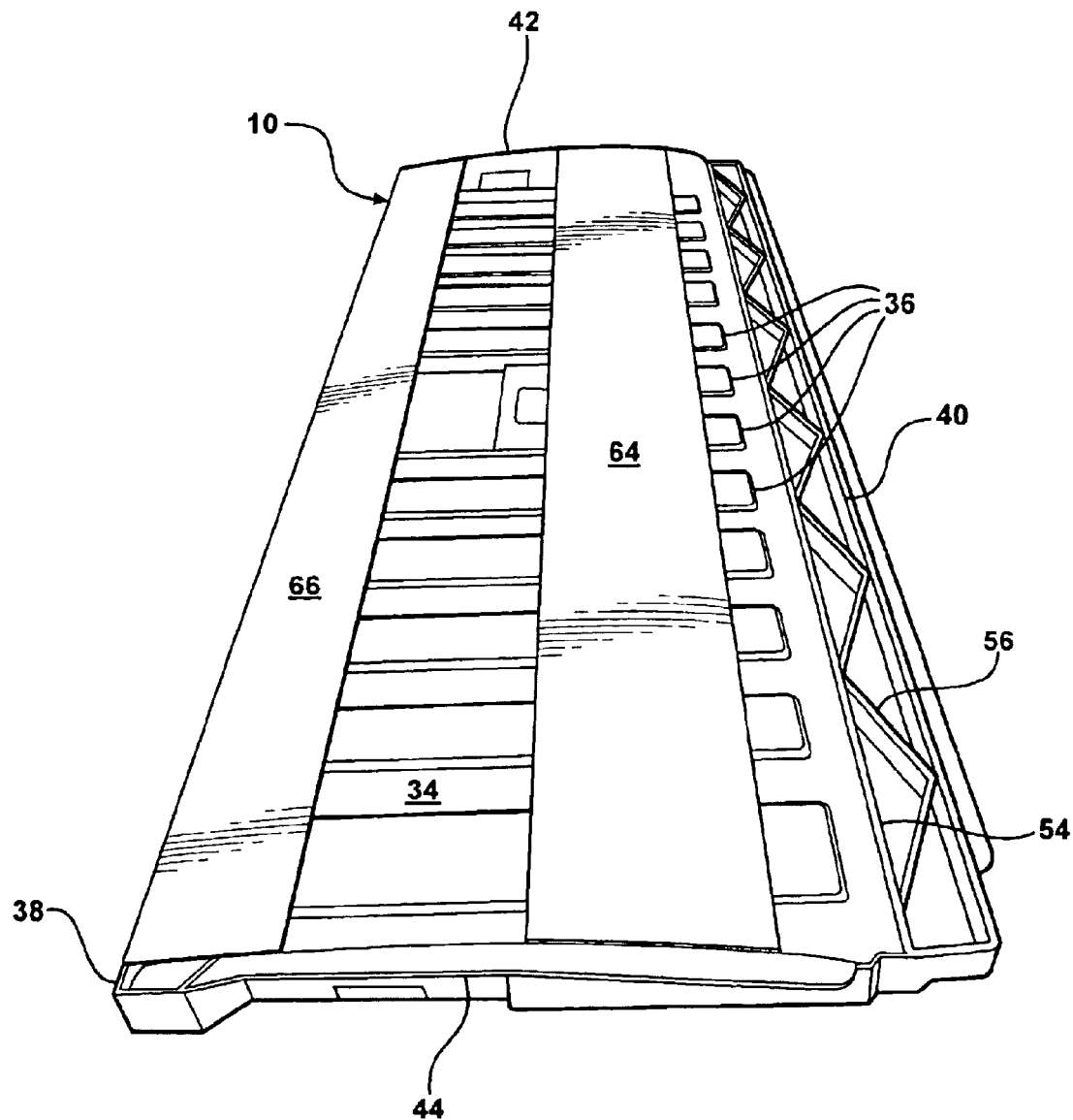
FIG. 3 is a perspective view of the inner structural panel including reinforcing panels secured thereto.
Figure 5:
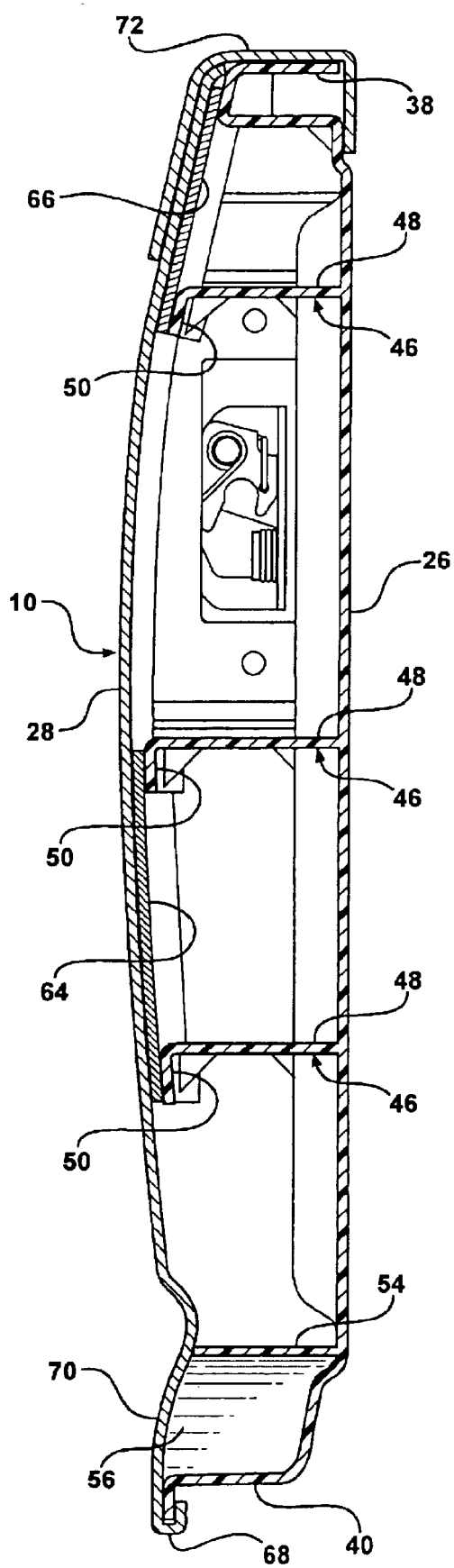
FIG. 5 is a cross-sectional, side view of the tailgate assembly.

The integrally formed inner structural panel 26 includes spaced apart, laterally extending upper 38 and lower 40 walls. Preferably, the upper wall 38 has a C-shaped cross-section, and the lower wall 40 has an inverted L-shaped cross-section, as shown in FIG. 5. A pair of opposing end walls 42, 44 extends longitudinally between the upper 38 and lower 40 walls, as shown in FIG. 3.

Referring back to FIG. 2, a plurality of ribs, each generally indicated at 46, extends laterally between the end walls 42, 44 along the support surface 34 of the inner structural panel 26. The plurality of ribs 46 is spaced between the upper 38 and lower 40 walls and extends generally parallel thereto. In the preferred embodiment, each of the plurality of ribs 46 is L-shaped. More specifically, each of the plurality of ribs 46 includes a base portion 48 and a top flange 50 extending out therefrom. The top flange 50 is spaced apart from the support surface 34 of the inner structural panel 26.

A plane rib 54 extends laterally between the end walls 42, 44 and is disposed adjacent to the lower wall 40. The plane rib 54 does not include a top flange. A support rib 56 extends between the plane rib 54 and the lower wall 40. In the preferred embodiment, the support rib 56 is non-linear and extends in a zigzag pattern. It is, however, appreciated that the support rib 56 may extend in any non-linear reciprocating pattern. The plane 54 and support 56 ribs provide structural support to a bottom portion of the tailgate assembly 10.

The upper wall 38 and the plurality of ribs 46 define first 58, second 60, and third 62 spaces along the support surface 34 of the inner structural panel 26. Each of the spaces 58, 60, 62 extends continuously between the end walls 42, 44.

Referring to FIG. 3, the tailgate assembly 10 includes first 64 and second 66 reinforcing panels for closing or boxing the respective first 58 and second 60 spaces. In the preferred embodiment, the first reinforcing panel 64 is coupled to the two lowermost of the plurality of ribs 46, and the second reinforcing panel 66 is coupled to the upper wall 38 and the uppermost one of the plurality of ribs 46. Each of the first 64 and second 66 reinforcing panels is rectangular-shaped and extends between the end walls 42, 44.

The first 64 and second 66 reinforcing panels can be affixed to the upper wall 38 and to the plurality of ribs 46 in any of numerous ways including by adhesive, sonic welding, fasteners, screws, EMABOND® process, or any combination thereof. Each of the first 64 and second 66 reinforcing panels are formed from a reinforced organic material. The coupling of the first 64 and second 66 reinforcing panels to the portion of the plurality of ribs 46 provides a box structure, adding rigidity both to the inner structural panel 26 and to the tailgate assembly 10.

Figure 4:
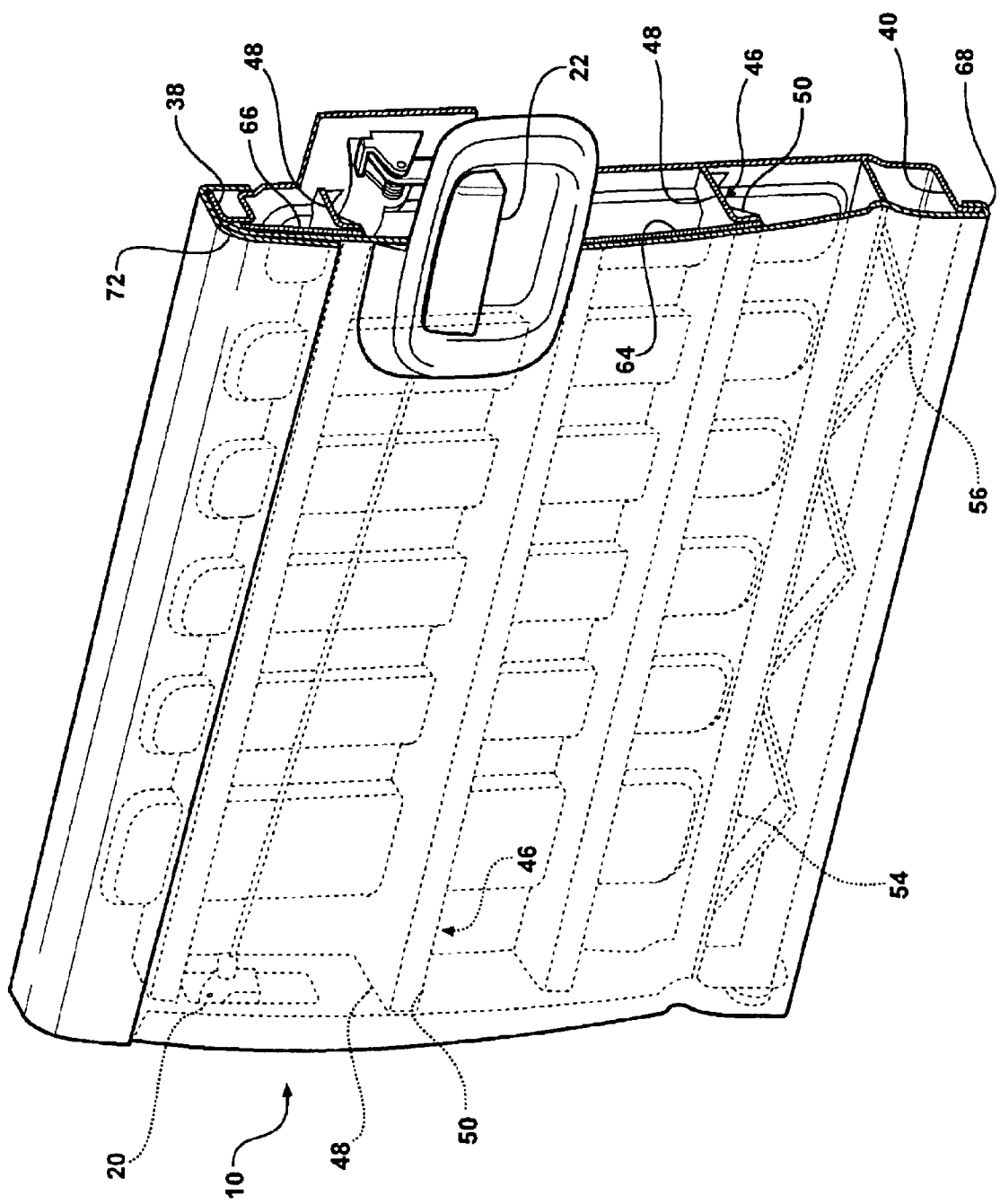
FIG. 4 is a fragmentary, perspective view of the tailgate assembly.

Referring to FIGS. 4 and 5, the outer panel 28 overlays the first 64 and second 66 reinforcing panels and extends around the upper 38 and lower 40 walls for coupling to the inner structural panel 26. The outer panel 28 optionally includes a lip flange 68 at a lower end 70. The lip flange 68 clips onto the lower wall 40 to secure the outer panel 28 to the inner structural panel 26.

A top rail cap 72 is secured over the outer panel 28 and the upper wall 38 of the inner structural panel 26. The top rail cap 72 has a uniform U-shaped cross-section and is secured to the tailgate assembly 10 by a snap fit or adhesive. The top rail cap 72 is preferably formed from an organic material and provides the tailgate assembly 10 with a finished appearance. Alternatively, cap 72 could also be formed from metal depending on styling requirements.

The outer panel 28 is molded from an organic material or formed from a lightweight metal in any conventional manner. Since the outer panel 28 is primarily decorative, it can be finished in any desired fashion. Further, the outer panel 28 can be easily changed or modified to suit the styling requirements of the motor vehicle 16. For instance, if a special edition motor vehicle requires additional contouring, styling, or lettering of the tailgate exterior, a special outer panel may be manufactured without changing or modifying the rest of the tailgate assembly 10.

The tailgate assembly 10 is lighter in weight than a conventional metal, stamped tailgate assembly of the same size. In addition, the use of plastic materials results in a tailgate assembly that is resistant to corrosion. The closure of the spaces 58, 60, 62 by the first 64 and second 66 reinforcing panels provides the tailgate assembly 10 with a stable box-like configuration. Thus, when the tailgate assembly 10 is loaded to a specified maximum loading condition, the tailgate assembly 10 will momentarily deflect and return to its original shape when unloaded. The prior art steel tailgate will deflect and become permanently distorted under the same maximum load conditions.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A tailgate assembly for a motor vehicle, said tailgate assembly comprising:

an integrally formed inner structural panel including a support surface, opposing upper and lower walls extending laterally along said support surface, a pair of end walls extending between said upper and lower walls, and a plurality of ribs spaced apart and disposed between said upper and lower walls and extending laterally between said end walls;

a reinforcing panel secured to said inner structural panel between at least two of said plurality of ribs providing a box structure; and an outer panel overlying said reinforcing panel and extending between said upper and lower walls and said end walls.

2. A tailgate assembly as set forth in claim 1 wherein each of said plurality of ribs includes a top flange for receiving said reinforcing panel therealong.

3. A tailgate assembly as set forth in claim 2 wherein said inner structural panel includes a plane rib extending laterally along said support surface adjacent to and spaced apart from said lower wall.

4. A tailgate assembly as set forth in claim 3 wherein said inner structural panel further includes a non-linear support rib extending between said plane rib and said lower wall.

5. A tailgate assembly as set forth in claim 4 including a top rail, cap secured over said outer panel and said inner structural panel for providing said tailgate assembly with a finished appearance.

6. A tailgate assembly as set forth in claim 5 wherein said outer panel includes a lip flange extending over said lower wall securing said outer panel to said inner structural panel.

7. A tailgate assembly as set forth in claim 6 wherein said inner structural panel includes a loading surface opposite said support surface defining a plurality of recesses.

8. A tailgate assembly as set forth in claim 7 wherein said inner structural panel is formed from a thermoplastic material.

9. A tailgate assembly as set forth in claim 8 wherein said reinforcing panel is formed from a reinforced organic material.

10. An inner structural panel for a tailgate assembly of a motor vehicle, said inner structural panel comprising:

a support surface having a plurality of spaced apart ribs extending laterally from said support surface to a free distal end; and a reinforcing panel secured to said distal end of at least two of said plurality of ribs to box said inner structural panel.

11. An inner structural panel as set forth in claim 10 wherein each of said plurality of ribs includes a top flange extending transverse from said distal end thereof for receiving said reinforcing panel therealong.

12. An inner structural panel as set forth in claim 11 including spaced apart upper and lower walls extending laterally along said support surface.

13. An inner structural panel as set forth in claim 12 including a pair of end walls extending longitudinally along said support surface between said upper and lower walls.

14. An inner structural panel as set forth in claim 13 including a plane rib extending laterally along said support surface adjacent to and spaced apart from said lower wall.

15. An inner structural panel as set forth in claim 14 including a non-linear support rib extending between said plane rib and said lower wall.

16. An inner structural panel as set forth in claim 15 including a top rail cap secured over an outer panel and said upper wall for providing the tailgate assembly with a finished appearance.

17. An inner structural panel as set forth in claim 16 including a loading surface opposite said support surface defining a plurality of recesses.

18. An inner structural panel as set forth in claim 17 wherein said reinforcing panel is formed from a reinforced organic material.

* * * * *